No. 676,912. Patented June 25, 1901.
E. QUESTER.
MACHINE FOR CRUSHING STEMS OR STALKS OF TOBACCO PLANTS.
(Application filed Dec. 24, 1900.)
(No Model.) 3 Sheets—Sheet 1.

Witnesses
A. K. Alexander
Thomas Kirkpatrick

Inventor
Edward Quester
by Alexander & Co
Attorneys

THE NORRIS PETERS CO., PHOTO-LITHO., WASHINGTON, D. C.

No. 676,912. Patented June 25, 1901.
E. QUESTER.
MACHINE FOR CRUSHING STEMS OR STALKS OF TOBACCO PLANTS.
(Application filed Dec. 24, 1900.)
(No Model.) 3 Sheets—Sheet 3.

Witnesses
A. T. Alexander
Thomas Kirkpatrick

Inventor
Eduard Quester
by Alexander & Co
Attorneys

UNITED STATES PATENT OFFICE.

EDUARD QUESTER, OF COLOGNE-LINDENTHAL, GERMANY.

MACHINE FOR CRUSHING STEMS OR STALKS OF TOBACCO-PLANTS.

SPECIFICATION forming part of Letters Patent No. 676,912, dated June 25, 1901.

Application filed December 24, 1900. Serial No. 40,918. (No model.)

*To all whom it may concern:*

Be it known that I, EDUARD QUESTER, a citizen of Germany, residing at Cologne-Lindenthal, Germany, have invented certain new and useful Improvements in Machines for Crushing the Stems or Stalks of Tobacco-Plants, of which the following is a specification.

This invention relates to machines for flattening or crushing the stems or stalks of tobacco-plants. In such machines as at present commonly constructed there is a single pair of rollers, by means of which the crushing or flattening of the stalks is effected. This treatment by a single pair of rollers, however, has not been very efficient, as the stems or stalks have remained hard and have become too moist from the excess of moisture supplied to the rollers. Consequently the stems or stalks were very seriously lowered in quality and could be utilized for pipe-tobacco only.

By treatment in a machine constructed to embody these improvements the stems are only moistened sufficiently and are rendered pliable and leaf-like without any deterioration, so that they may be used in the manufacture of cigars. This result is attained by furnishing the machine with a second pair of rollers, which effect the final flattening or crushing of the stems or stalks after they have passed through the first pair of rollers. Means or devices are also employed by which the application of the moisture can be regulated, so that the tobacco is only sufficiently moistened and is not reduced in quality.

So that this invention may be more readily understood I have hereto appended drawings, to which reference is hereinafter made and which illustrate one of the improved machines.

Figure 1:
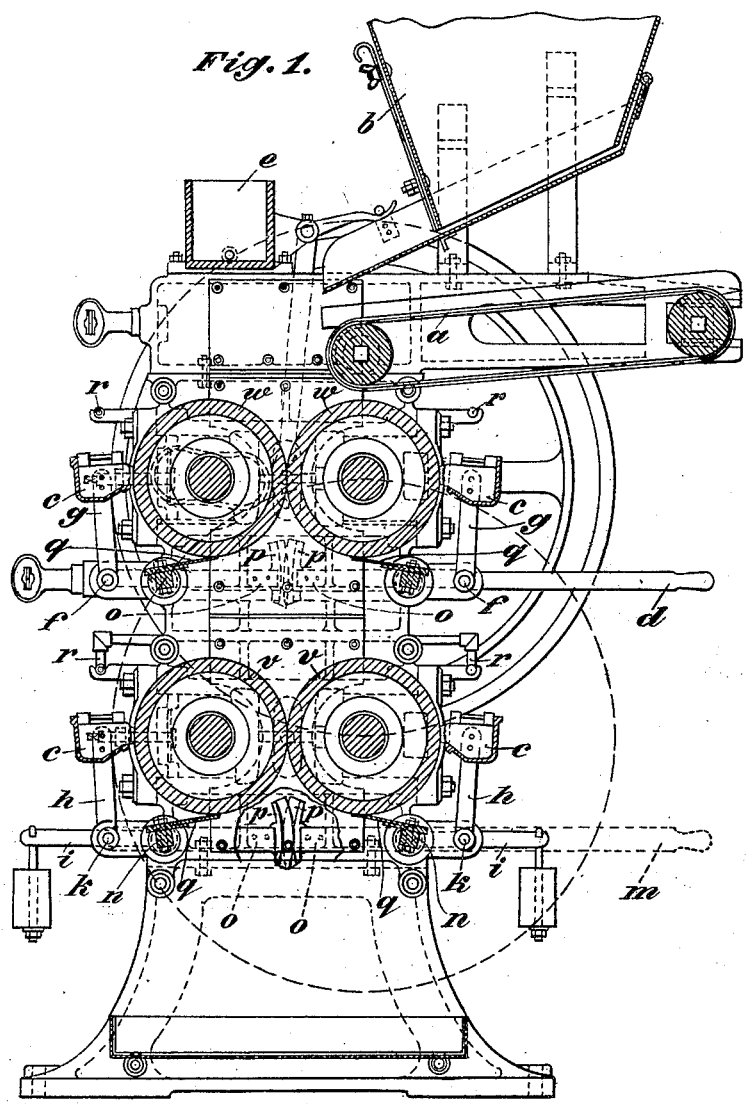
Figure 2:
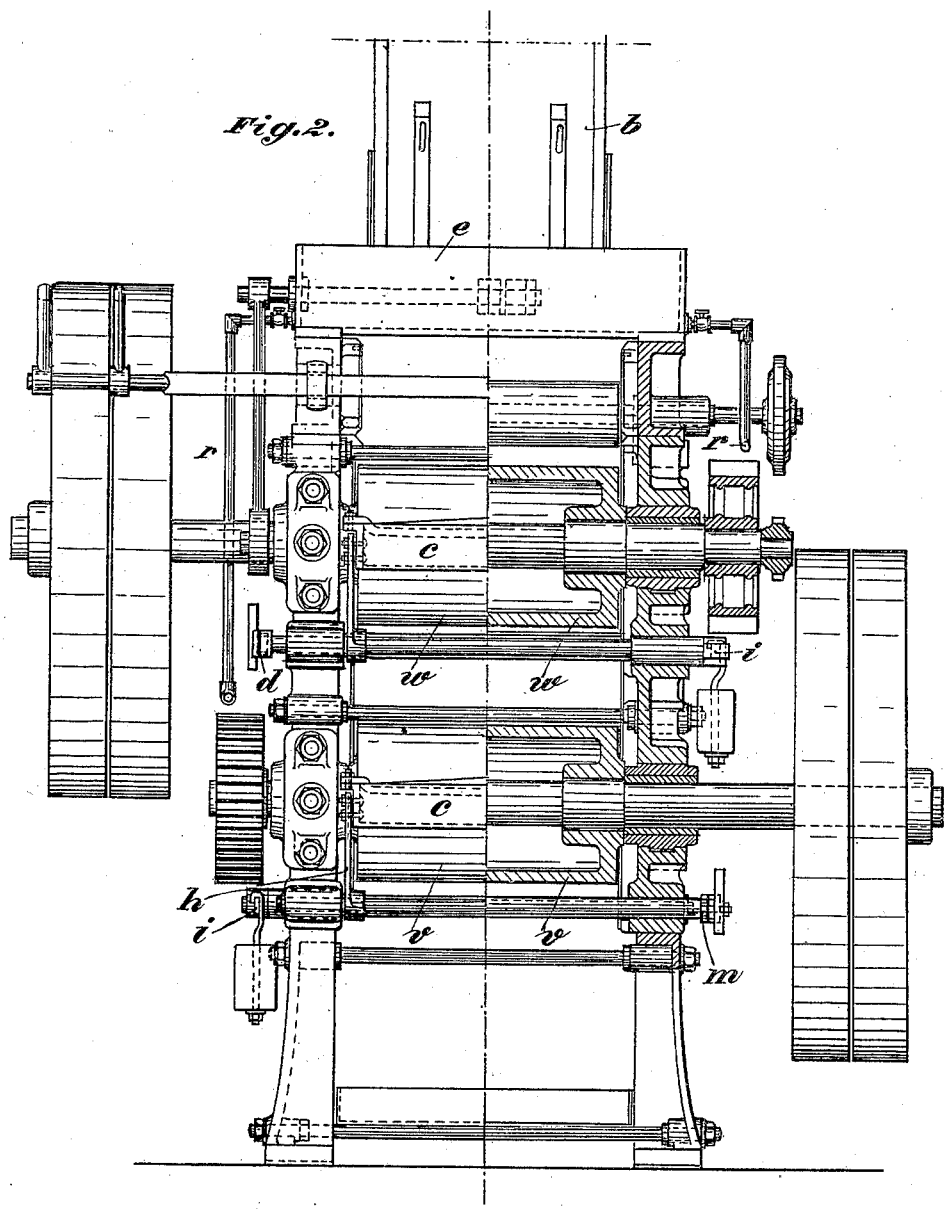
Figure 3:
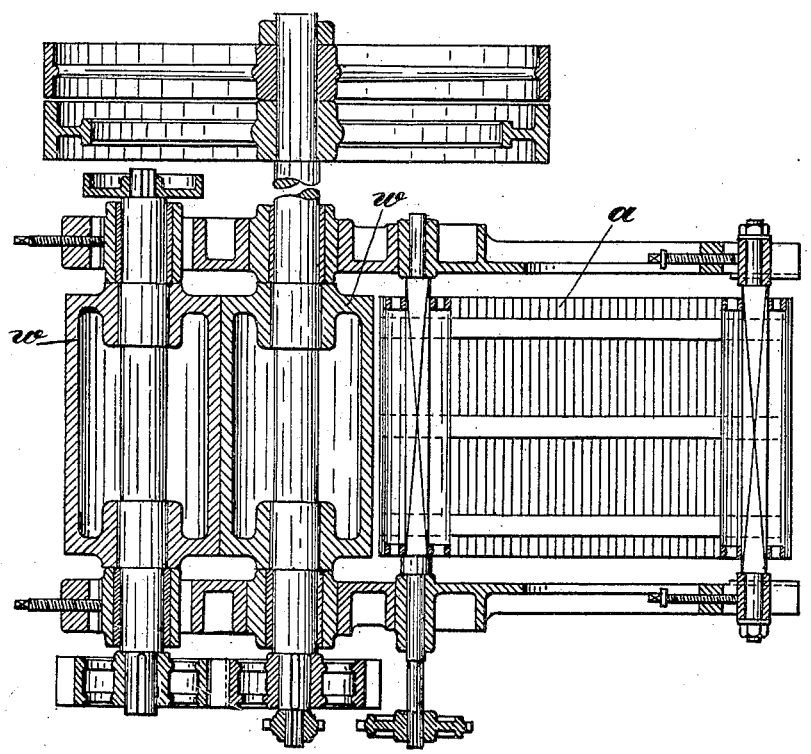
Figure 4:
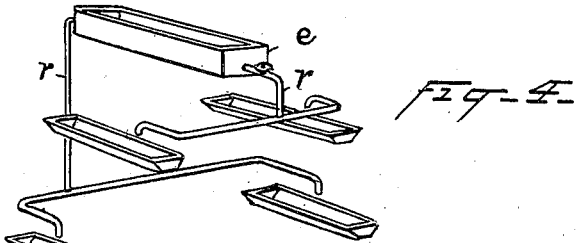

Figure 1 represents the machine in cross-section. Fig. 2 shows it in sectional elevation. Fig. 3 illustrates it in sectional plan. Fig. 4 is a diagrammatic view showing the connections between the tank and the trough.

Referring to the drawings, it will be seen that the machine is provided with two pairs of rollers, $w$ $w$ being the upper pair and $v$ $v$ the lower pair. The whole or complete stems are conveyed to the upper rollers by means of an endless band $a$ and the cut stems are fed to them by the hopper $b$. The rollers are suitably driven, preferably by applying power to one roller of each pair and gearing it to the other roller of the pair in any suitable and well-known manner. (See Figs. 2 and 3.) The shape and diameters of the rollers may vary. They are preferably arranged so that one pair is directly above the other pair. They may be arranged at any desired distance apart, and the stems may be conveyed from one to the other in any suitable manner.

Boxes or troughs $c$ are arranged parallel to the rollers and are mounted upon or secured to levers $g$ $h$. The levers $g$ are fixed to the shafts $f$ and the levers $h$ to the shafts $k$. By means of handles the levers may be moved so that the boxes are caused to approach and come into contact with the rollers. The weight of the boxes or troughs is normally enough to so move the levers that the troughs are kept out of contact with the rollers. By moving the levers or handles $d$ $m$ toward the rollers the boxes or troughs $c$ are pressed against the rollers. The side of the boxes nearest the rollers are open and are filled with sponge or similar material, by means of which the liquid or moisture is applied. Thus the amount or degree of moisture may be varied by varying the pressure upon the handles. The movements of the handles are transmitted to the troughs $c$ on the other side of the machine by means of levers $o$ and intergeared segments $p$.

Counterweighted levers $i$ are secured to the shafts $n$, and these shafts are furnished with scrapers $q$, which by means of the counterweights are kept constantly pressed against the rollers and remove any stems or the like which may adhere to them.

$e$ is the main water-supply tank, which communicates with the troughs $c$ by means of pipes $r$. The troughs $c$ may be utilized from time to time to cleanse the rollers by maintaining the sponges in close contact with them for some time.

As the application of the moisture is completely under the control of the attendant, excessive moistening is easily avoided.

Having now particularly described and ascertained the nature of my said invention and in what manner the same is to be performed, I declare that what I claim is—

1. In a machine for flattening or crushing tobacco-stems, the combination with a pair of rollers, of a lever adjacent to each roller, a trough on each lever, a water-tank, and pipes leading from said tank to each trough.

2. In a machine for flattening or crushing tobacco-stems, the combination with pairs of rollers, of a lever adjacent to each roller, a trough on each lever, intermeshing segment-gears connecting the levers for each pair of rollers, and means for supplying water to said troughs.

In witness whereof I have hereunto signed my name in the presence of two subscribing witnesses.

EDUARD QUESTER.

Witnesses:
OTTO SCHULZ,
WOLDEMAR HAUPT.